No. 773,771. PATENTED NOV. 1, 1904.
H. W. ADAMS, Jr.
VEHICLE WHEEL.
APPLICATION FILED MAR. 16, 1904.
NO MODEL.
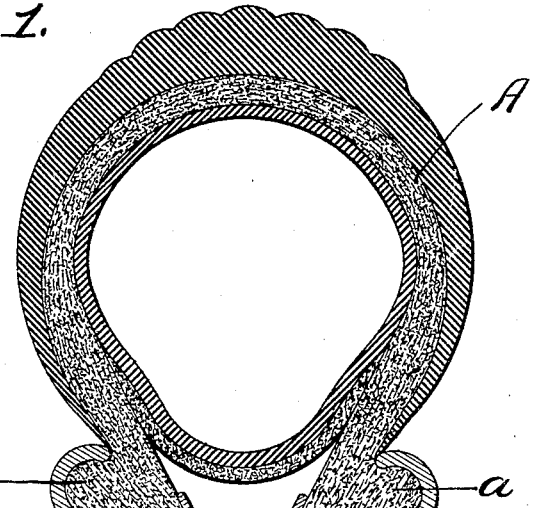
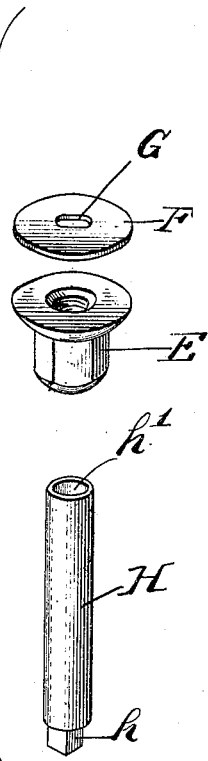
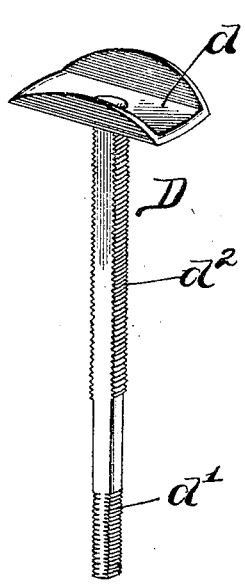
Witnesses:
J B Weir
Robert H. Weir
Inventor:
Henry W. Adams, Jr.
By Bulkley & Durand
Attys.

No. 773,771.                                          Patented November 1, 1904.

UNITED STATES PATENT OFFICE.

HENRY W. ADAMS, JR., OF CHICAGO, ILLINOIS, ASSIGNOR TO SCOVILL MANUFACTURING COMPANY, OF WATERBURY, CONNECTICUT, A CORPORATION OF CONNECTICUT.

VEHICLE-WHEEL.

SPECIFICATION forming part of Letters Patent No. 773,771, dated November 1, 1904.

Application filed March 16, 1904. Serial No. 198,386. (No model.)

*To all whom it may concern:*

Be it known that I, HENRY W. ADAMS, Jr., a citizen of the United States of America, and a resident of Chicago, Cook county, Illinois, have invented a certain new and useful Improvement in Vehicle-Wheels, of which the following is a specification.

My invention contemplates an improved construction whereby the features of more effectually preventing the pneumatic tire from working loose on the channel-iron, permitting considerable variation in the size of the tire and the thickness of the felly without changing the size of the clamping bolts and nuts, and protecting the screw-threads of said bolts and nuts against dust and mud, may be advantageously and effectively combined in a vehicle-wheel adapted more particularly for use on automobiles.

In the accompanying drawings, Figure 1 is a full-sized cross-section of a wheel constructed in accordance with my invention; Fig. 2, a perspective of one of the clamping-bolts, and Fig. 3 a perspective of the nuts and washer for said bolt.

My invention comprises a pneumatic tire A, preferably of the clencher type, a channel-iron B, a felly C, and clamping-bolts D, extending through the channel-iron and felly, each clamping-bolt having a head $d$ engaging and holding the base portions $a$ of the tire in place on the channel-iron and each clamping-bolt having also relatively large and small threaded portions, the relatively small or reduced end portion $d'$ being of substantial length and the relatively large portion $d^2$, which extends through the channel-iron and felly, being preferably flattened to fit a similarly-shaped hole $b$ in the channel-iron, so as to insure accurate adjustment of the bolt-head relatively to the tire, each bolt thus formed with threaded portions of different diameters being held in place by means of a clamping-nut E screwed upon its larger diameter and clamping or bearing upon the washer F, said washer having an elongated opening G fitting the flattened sides of the bolt and each clamping-nut being locked in place by a lock-nut H considerably longer than the said relatively small or reduced threaded end portion $d'$ of the bolt, said lock-nut having a closed outer end $h$, preferably polygonal and adapted to be engaged by a wrench, and having also relatively large and small bore portions or internal diameters, the larger bore portion or internal diameter $h'$ being unthreaded and adapted to extend over the larger diameter of the bolt to a greater or less extent, according to the thickness of the felly, and the smaller bore portion or internal diameter $h^2$ being threaded and screwed upon the smaller diameter or reduced outer end portion of the bolt.

I find that with a construction of this character the various parts are easily and accurately assembled in place and held together without danger of working loose and without liability of dust or mud entering the screw-threads and that the thickness of the felly and the size of the tire may vary considerably without necessitating any change in the size of the bolt and nuts.

What I claim as my invention is—

1. A vehicle-wheel comprising a suitable felly, a pneumatic tire supported on said felly, a clamping-bolt holding the tire in place and extending through the felly, said bolt having relatively large and small diameters, a clamping-nut screwed upon the larger diameter of the bolt, and a lock-nut screwed upon the smaller diameter of the bolt and bearing against the clamping-nut, said lock-nut being closed at its outer end and its length being greater than the length of the said smaller diameter of the bolt, and said lock-nut being also provided with relatively large and small internal diameters, the relatively small internal diameter being threaded, and the relatively large internal diameter being unthreaded and adapted to extend more or less over the larger diameter of the bolt, according to the thickness of the felly, substantially as shown and described.

2. A vehicle-wheel comprising a felly having an opening, a channel-iron provided with an opening registering with the opening in the felly, a pneumatic tire seated in said channel-iron, a clamping-bolt extending through the channel-iron and felly and provided with a head engaging the base portions of said tire, said bolt having relatively large and small diameters, the larger diameter being flattened longitudinally for some distance and thereby fitting said opening in the channel-iron, a washer fitting the flattened larger diameter of the bolt and bearing against the felly, a clamping-nut screwed onto the larger diameter of the bolt and bearing against said washer, and a lock-nut screwed upon the smaller diameter of the bolt and bearing against the clamping-nut, said lock-nut being closed at its outer end and its length being greater than the length of said smaller diameter of the bolt, and said lock-nut being also provided with a polygonal portion and relatively large and small internal diameters, the smaller internal diameter being threaded, and the larger internal diameter being smooth and straight and adapted to extend more or less over the larger diameter of the bolt, according to the thickness of the felly, substantially as shown and described.

Signed by me at Chicago, Cook county, Illinois, this 10th day of March, 1904.

HENRY W. ADAMS, Jr.

Witnesses:
SEVERINUS B. CHABOUSKI,
WM. A. HARDERS.